United States Patent
Benn et al.

(10) Patent No.: US 7,655,183 B2
(45) Date of Patent: Feb. 2, 2010

(54) DURABLE PD-BASED ALLOY AND HYDROGEN GENERATION MEMBRANE THEREOF

(75) Inventors: Raymond C. Benn, Madison, CT (US); Susanne M. Opalka, Glastonbury, CT (US); Thomas Henry Vanderspurt, Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 63 days.

(21) Appl. No.: 11/712,200

(22) Filed: Feb. 28, 2007

(65) Prior Publication Data

US 2007/0240566 A1  Oct. 18, 2007

Related U.S. Application Data

(63) Continuation-in-part of application No. PCT/US2005/047045, filed on Dec. 23, 2005.

(51) Int. Cl.
*C22C 5/04* (2006.01)
*C22C 5/00* (2006.01)
*C22C 30/00* (2006.01)
*B01J 20/28* (2006.01)
*B01J 35/00* (2006.01)

(52) U.S. Cl. ............... 420/463; 148/430; 148/442; 96/4; 502/4

(58) Field of Classification Search .......... 420/463; 96/4; 95/56; 502/4; 148/430, 442
See application file for complete search history.

(56) References Cited

U.S. PATENT DOCUMENTS 3,155,467 A * 11/1964 Yamamoto et al. ............. 95/56
3,439,474 A 4/1969 McKinley .................... 55/16

FOREIGN PATENT DOCUMENTS

JP  2003064435 A  *  3/2003
JP  2004292217 A  *  10/2004
JP  2006-722 A2  1/2006

OTHER PUBLICATIONS

Way, J. D., "Paladium/Copper Alloy Composite Membranes for High temperature Hydrogen Separation from Coal-Derived Gas Streams", U. S. DOE Report under DOE Grant DE-FG26-99FT40585, 2002.

(Continued)

*Primary Examiner*—Roy King
*Assistant Examiner*—Caitlin Fogarty
(74) *Attorney, Agent, or Firm*—Stephen A. Schneeberger

(57) ABSTRACT

A durable Pd-based alloy is used for a $H_2$-selective membrane in a hydrogen generator, as in the fuel processor of a fuel cell plant. The Pd-based alloy includes Cu as a binary element, and further includes "X", where "X" comprises at least one metal from group "M" that is BCC and acts to stabilize the β BCC phase for stability during operating temperatures. The metal from group "M" is selected from the group consisting of Fe, Cr, Nb, Ta, V, Mo, and W, with Nb and Ta being most preferred. "X" may further comprise at least one metal from a group "N" that is non-BCC, preferably FCC, that enhances other properties of the membrane, such as ductility. The metal from group "N" is selected from the group consisting of Ag, Au, Re, Ru, Rh, Y, Ce, Ni, Ir, Pt, Co, La and In. The at. % of Pd in the binary Pd—Cu alloy ranges from about 35 at. % to about 55 at. %, and the at. % of "X" in the higher order alloy, based on said binary alloy, is in the range of about 1 at. % to about 15 at. %. The metals are selected according to a novel process.

15 Claims, 4 Drawing Sheets

OTHER PUBLICATIONS

Ma, Y. H., et al, "Composite Palladium and Palladium-alloy Membranes for High Temperature Hydrogen Separations", ACS Fuel Chemistry Division preprints, 2003, 48(I), pp. 333, 334.

Morreale, B. D., et al, "Effect of Hydrogen-sulfide on the Hydrogen Permeance of Palladium-copper Alloys at Elevated Temperatures", Journal of Membrane Science, 241 (2004) pp. 219-224.

Makkonen, I., et al, "Ab initio Studies of Stepped Pd Surfaces with and without S", Physiacl Review B 67, 165415 (2003).

Hansen, M., "Constitution of Binary Alloys", McGraw-Hill Book Co., 1958, pp. 612-615.

Subramanian, P. R., et al, "Alloy Phase Diagrams", "Cu,Pd", 1992-2002, ASM International.

Bain, E. C., et al, Alloying Elements in Steel, ASM, 1966, pp. 111,112.

Benn, R. C., "ODS majority gamma prime phase nickel-base superalloy", in *Superalloys* 1980, Sep. 1980, pp. 541-550.

Benn, R. C., et al, "Design of Oxide Dispersion Strengthened Superalloys", in *High Temperature Alloys: Theory and Design*, Confr. Proceedings, pp. 419-444, TMS-AIME, 1984.

* cited by examiner

DURABLE PD-BASED ALLOY AND HYDROGEN GENERATION MEMBRANE THEREOF

This application is a continuation-in-part of International Application PCT/US2005/047045, with an international filing date of Dec. 23, 2005 and from which priority is claimed.

U.S. GOVERNMENT LICENSE RIGHTS

The U.S. Government has a paid-up license in this invention and the right in limited circumstances to require the patent owner to license others on reasonable terms as provided for by the terms of (contract No. DE-FC26-05NT42453) awarded by the Department of Energy.

TECHNICAL FIELD

This invention relates to a durable palladium-based alloy, especially for use in a hydrogen generation membrane. More particularly, the invention relates to a durable palladium-based alloy having stability as a hydrogen separation membrane in water gas shift (WGS) and/or reforming applications in the production and purification of hydrogen. More particularly still, the invention relates to such alloy and membrane being relatively tolerant to sulfur.

BACKGROUND ART

The trend towards "clean energy" and a "hydrogen economy" will be enabled by the efficient supply (e.g. from biomass) and distribution of low cost hydrogen. Fossil fuels can also be converted to hydrogen. The resulting hydrogen is then available for a number of applications, with the fueling of the electrochemical reaction in a fuel cell being one prominent use. Today most commercial hydrogen is produced through catalytic steam reforming of natural gas followed by one or more water gas shift reactors. In the future the gasification of coal and other forms of carbon like lignite probably coupled with some form of carbon dioxide sequestration may also become an important source of hydrogen. However, the low cost production of hydrogen from these resources requires significant technological advances in both hydrogen separation/purification and the efficiency of the Water Gas Shift (WGS) reaction. The WGS reaction:

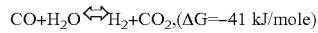

$$CO + H_2O \leftrightarrow H_2 + CO_2, (\Delta G = -41 \text{ kJ/mole})$$

is critical to most hydrogen production routes. However, as is expected for exothermic reactions, thermodynamic equilibrium dictates the lower the temperature, the further the reaction can proceed toward the $H_2$ production side. Unfortunately, catalytic activity decreases with temperature and catalysts become more easily inhibited or poisoned, e.g. by sulfur in particular.

Recently, noble metal-based WGS shift catalysts with sufficient volumetric activity and thermal stability have been demonstrated. These easily operate in the 300 to 400° C. range. Such catalysts are well suited to work in concert with a hydrogen separation membrane to both purify the hydrogen produced and to help drive the Water Gas Shift reaction by removing the hydrogen product as it is formed. Thin palladium (Pd), or Pd alloy, membranes, supported on a porous substrate, are suitable for high temperature hydrogen separation and membrane reactor applications, and their application has been discussed in the prior art. Use of such separation membranes avoids the difficulties with present methods of hydrogen separation like Pressure Swing Absorption (PSA). PSA is capital intensive, has a large footprint and high operating costs.

There are important situations where improved sulfur tolerance of both the Water Gas Shift catalyst and the Pd alloy membrane would greatly facilitate the production of fuel cell-grade hydrogen. One is in the small scale production of hydrogen from reformate produced from logistic fuels like gasoline, kerosene, diesel or jet fuel. Reformate is produced by reacting these hydrocarbons with oxygen and/or water in catalytic partial oxidation, autothermal reforming or catalytic steam reforming processes. The resulting "reformate" is a mixture of carbon monoxide and hydrogen, also with some carbon dioxide, water, methane and often nitrogen, etc. For this application, the membrane has be sulfur tolerant enough to handle 20 ppm-wt S-containing fuel that produces on a dry basis about 3 ppmV S reformate. The sulfur content or partial pressure may be lower depending on the amount of $N_2$ from the air introduced into the reforming process. Membranes for hydrogen recovery from such reformates typically require a hydrogen permeance of about 10 $m^3/(m^2\text{-hr-atm}^{0.5})$ at 350° C., though a higher permeance of 50 $m^3/(m^2\text{-hr-atm}^{0.5})$ at 350° C. in the absence of sulfur is very desirable, as the higher the permeance, the smaller the membrane area needed. In the presence of $\leq 6$ ppmV sulfur at a partial pressure (as $H_2S$ or equivalent) of about $7 \times 10^{-5}$ atm or less, slightly lower permeance can be accepted because the cost of sulfur removal can be avoided. Usually for hydrogen recovery, the reformate undergoes a Water Gas Shift Step to adjust the $H_2/CO_x$ ratio, and it is desirable for the Pd-based hydrogen membrane to be compatible with the Water Gas Shift system and especially desirable for the membrane to be suitable for use in a membrane water gas shift reactor.

In portable or vehicular applications, the membrane life should be on the order of 5000 hours, but it should be able to withstand several hundreds of start-up and shutdown cycles with concomitant changes in gas pressure, composition and temperature. It must be tolerant of cycling from −40° C. to 500° C. and operating from ~200° C. to ~400° C.

Hydrogen separation membranes could play a key role in the large scale production of hydrogen from "cleaned" coal gas. A representative gas composition for an advanced dry-feed bituminous coal gasifier is: 34% $H_2$, 61% CO, 2% $CO_2$, 3% "other" (dry basis), along with about 200 ppmV sulfur-containing gas, typically an equilibrium mixture of $H_2S$ and COS (carbonyl sulfide). A slurry-fed coal gasifier will have proportionally more $H_2$ and $CO_2$ and less CO. For water gas shift, this gas would be blended with about 3 $H_2O$ for every CO. Because, for the Water Gas Shift reaction, the ratio of $H_2O$ to CO is typically about $3H_2O$ per CO in the feed, a Pd alloy for coal gas water gas shift service should be stable to at least ~420° C. in the presence of feed gas with partial pressures of, for example, in Atm.: ~6 $H_2$, 10.8 CO, 0.35 $CO_2$, 0.5 inerts and $CH_4$, 32.3 $H_2O$ and about 0.004 atm $H_2S$. As the reaction proceeds, CO+$H_2O$ react, providing $CO_2$ and $H_2$. Thus, the membrane also has to be stable to gas with higher $CO_2$ partial pressure. $H_2$ from the water gas shift reaction that is passed through the membrane and is termed "permeate". Assuming perhaps the permeate side of the membrane involves a counter flow steam sweep gas, then as much as 95% or more of the $H_2$ could diffuse through the membrane, lowering the $H_2$ partial pressure at the gas exit end of the membrane at which the reacted reformate, or "retentate", appears. The optimum amount of CO conversion achieved and the size of the membrane, and hence the degree of $H_2$ recovery, is typically a matter of site-specific economic calculations. Thus for illustrative purposes, the membrane has to remain stable and permeable to $H_2$ in the presence of (in atmospheres) about 1.22 $H_2$, 0.158 CO, 16.13 $CO_2$, 0.78 inerts and $CH_4$, 31.71 $H_2O$, and about 0.0052 $H_2S$ (in equilibrium with COS) in the retentate gas. Such a Pd membrane has to be stable for thousands of hours, preferably 8,000 hrs and more preferably >25,000 hrs, under these harsh operating conditions of >300° C., typically about 400° C. to 420° C., with a peak temperature of about 500° C. or more depending on the system in the presence of 0.005 atm partial pressure or more of sulfur as $H_2S$ and carbonyl sulfide. The membrane should have a hydrogen permeance of at least 20 $m^3/(m^2\text{-hr-atm}^{0.5})$. These operating conditions and the temporal stability required would be a severe challenge to all known Pd-based membranes. Furthermore, any useful hydrogen membrane has to endure, without cracking, system upsets that can result in sudden loss of temperature and pressure. While pure Pd membranes cannot withstand such system upsets, Pd alloys such as described below can.

Pd-atomic hydrogen interactions give rise to a β-phase Pd-hydride, unstable above 295° C. and an α-phase hydride, stable at high temperatures and characterized by markedly lower hydrogen content. At these higher temperatures, the miscibility gap between the α- and β-hydride phases narrows and they coalesce at a critical point around 295° C. and ~20 atm. The α-β-transition, occurring for pure Pd near room temperature, causes serious alteration in the atom spacing of the metal lattice. The consequent dimensional changes can distort the membrane, making it less mechanically resistant, more brittle and prone to rupture. As a result, the resistance to repeated start-up/shut-down cyclic stresses is low.

Binary addition elements, having in general Face-Centered-Cubic (FCC) structures such as Ag, stabilize the α-hydride phase against the β-hydride phase, reducing the problem of embrittlement, and yield a hydrogen permeability that is greater than that of pure Pd. However, Pd—Ag is rapidly and irreversibly poisoned by sulfur and even with the best sulfur clean-up technologies, there is a reasonable likelihood that a process upset or a change in feedstock will expose the membrane to sulfur. Clearly, neither Pd nor Pd—Ag membranes, in and of themselves, are suitable for use with sulfur-containing feed gas.

A somewhat sulfur-tolerant Body-Centered-Cubic (BCC) phase Pd-40 wt. % Cu alloy with a higher hydrogen permeance than pure Pd has been described in a 2002 DOE report by J. D. Way entitled "Palladium/Copper Alloy Composite Membranes for High Temperature hydrogen Separation from Coal-Derived Gas Streams". This alloy also avoids the alpha-hydride/beta hydride transition problem that plagues pure Pd. However, the optimum Pd—Cu composition is a BCC β-PdCu phase and is perilously close to the β-PdCu phase/α (FCC)+β(BCC) mixed phase stability boundary. This means that, with an increase in temperature, it can rapidly change structure, from the desirable BCC to the less desirable FCC phase, thus losing its hydrogen permeance and structural integrity. This structural change can be caused by a system upset that increases the temperature beyond the stability of the β phase or because of Pd—Cu segregation occurring over time. Sulfur-containing reformate, rich in CO, at elevated pressures such as described earlier is an ideal environment for this segregation.

Thus, there remains a need for a sulfur tolerant, long life, relatively low cost and high permeance Pd alloy, and a hydrogen generation membrane of such alloy, that does not suffer from either the alpha-hydride/beta-hydride transition problem, having a phase boundary close to the membrane operating point, or metal segregation under sulfur containing reformate with time, under conditions like the production of hydrogen from "cleaned" coal gas via the water gas shift reaction over a sulfur tolerant catalyst such as described above.

Accordingly, a primary advantage of the present invention is the provision of an improved Pd-based alloy, and a membrane of such alloy, that is durable under operating conditions of extended temperature ranges and/or sulfur presence. A further advantage is the provision of such alloy and/or membrane thereof having high $H_2$ permeance. Yet a further advantage is the provision of such alloy and/or membrane thereof being relatively cost effective. A still further advantage is the provision of an alloy and/or membrane thereof, having one or more of the foregoing characteristics and including Cu in the alloy. An even further advantage is the provision of a membrane having such characteristics in the context of incorporation/use with reforming and/or WGS reactors.

DISCLOSURE OF INVENTION

The present invention provides a Pd-based alloy for use in and/or as, an $H_2$ separation membrane, especially in WGS applications, which alloy has appropriate alloy phase control at the service conditions to achieve one or more, and typically all, of high permeance, sulfidation resistance, structural stability and long life. The Pd-based alloy of the invention is particularly suited for the production of cost effective $H_2$ separation membranes for use under challenging operating conditions in the production/separation of $H_2$. Further, the Pd is normally alloyed with at least Cu as a binary constituent of the alloy, for the increased sulfur tolerance afforded by such inclusion. Beyond these two basic constituents of the alloy, the invention provides for at least a one (ternary) constituent from a group "M" of metals that are BCC and act to stabilize the β BCC phase of the alloy such that any non-BCC type phases present in the alloy have negligible effect on temperature-related phase changes of the alloy, thereby to retain hydrogen permeability during operating temperature and pressure cycles.

The invention, in one embodiment, provides, in addition to the at least one constituent from group M, for at least one constituent from a further group of metals "N" that are non-BCC (e. g., are FCC) and act to enhance a further property of the membrane other than thermal stability. For convenience of discussion, the alloy of the invention may be identified as PdCuX, where "X" includes at least one or more metal constituents from the group "M", and optionally, also includes one or more metal constituents from the group "N". Indeed, in the extreme, "X" may include multiple constituents from one, the other, or both of the groups M and N. The PdCuX alloy, where X=M+N, may change from one phase to the other as a function of temperature according to Gibb's Phase Rule (which determines the possible number of degrees of freedom in a closed system at equilibrium, in terms of separate phases and the number of chemical constituents in the system). Specifically, one aspect of the present invention is the stabilization of the PdCuX alloy in the β (BCC) phase during the service, or operating, temperature range. A further aspect is to do so with acceptable hydrogen permeability, as well as CO and sulfur tolerance.

The metals constituting the group "M" consist of Fe, Cr, Nb, Ta, V, Mo, and W, with perhaps Nb and Ta being the most preferred because their lattice sizes are closest to Pd and Cu. The metals constituting the group "N" consist of Ag, Au, Re, Ru, Rh, Y, Ni, Ce, Pt, Ir, Co, La and In, with perhaps Au being the most preferred because of its likelihood of better sulfur tolerance than most other members of the group, and its positive effect on improved ductility.

In the context of the parameters above, the atomic % of Pd present in the alloy is in the general range of 35-55 at. %, the Cu is present in the general range of 30-64 at. %, and the remaining constituent(s) X of the alloy is/are present in the general range of 1-15 at. %. In a more preferred formulation of the alloy, the Pd is present in a range of 38-50 at. %, the Cu is present in a range of 50-62 at. %, and the remaining constituent(s) X is/are present in the range of 4-10 at. %. Of two different specific formulations, each particularly preferred, one is preferred for minimum phase change and has 40 at. % Pd, 53 at. % Cu and 7 at. % X, whereas the other is preferred for maximum permeability and has 47 at. % Pd, 46 at. % Cu and 7 at. % X.

Still further, the alloy of the invention finds particular use as, or in, an $H_2$ separation membrane in a water gas shift membrane reactor, a hydrocarbon or biomass reforming reactor, and/or a reforming reactor.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1A:
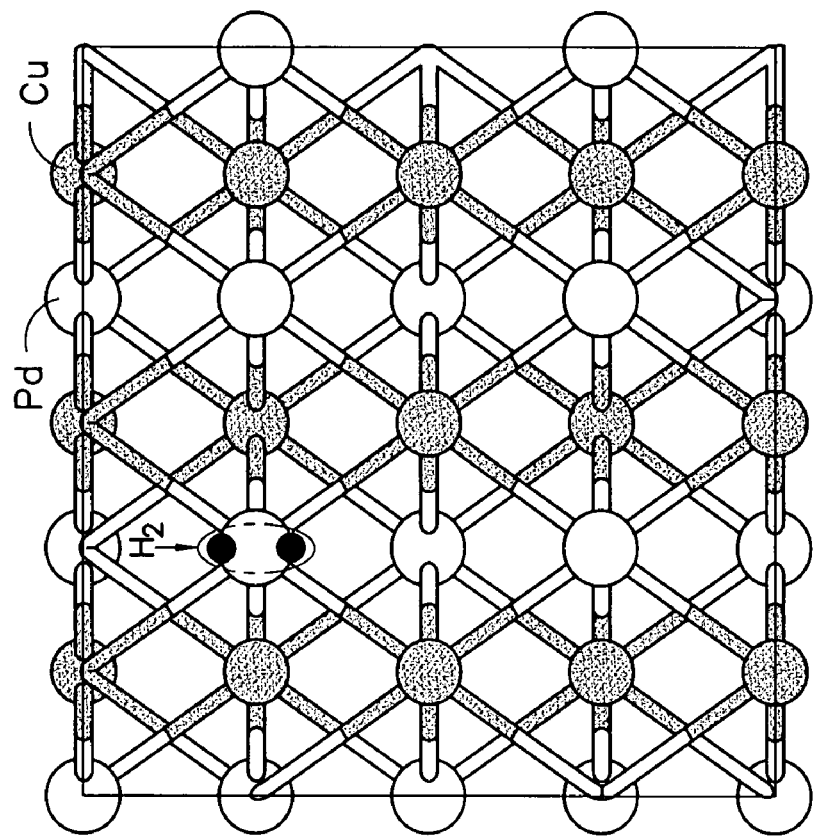
FIG. 1A depicts the adsorption of $H_2$ on (110) lattice plane of 50 at. % Pd-50 at. % Cu alloy.

A description of the invention initially includes further reference to the Background Art discussed previously, followed by a detailed description of the invention and one or more preferred modes for carrying out the invention, with reference to the accompanying drawings.

Alloy development plays an important role in overcoming the problem of Pd embrittlement and in developing S-tolerant Pd-based alloy membranes. As a function of temperature and hydrogen partial pressure, Pd-hydrogen interactions give rise to a β hydride-phase, unstable above 295° C. and an a-phase, stable at high temperatures and characterized by markedly lower hydrogen content. The α-β hydride transition causes serious alteration in the atom spacing of the metal lattice. The consequent dimensional changes can distort the membrane, making it less mechanically resistant, more brittle and prone to rupture. As a result, the resistance to repeated start-up/shut-down cyclic stresses could be low.

As mentioned earlier, the binary addition elements such as Ag, Ru, Rh, Y, Ni, Ce, Cu and Au may stabilize the α-hydride phase against the β-hydride phase, reducing the problem of embrittlement. For these binaries and certain ternary Pd alloys such as Pd—Ru—In, Pd—Ag—Ru and Pd—Ag—Rh, the hydrogen permeability is greater than that of pure Pd, as indicated in Table I below, taken from a paper by H. Y. Ma, et al., entitled "Composite Palladium and Palladium-alloy Membranes for High Temperature Hydrogen Separations", ACS Fuel Chemistry preprints, 2003, 48(1), 333.

TABLE I

Improvement in permeability of various binary Pd alloys at 350° C.

| Alloy Metal | Wt. % for Maximum Permeability | Normalized Permeability ($P_{alloy}/P_{Pd}$) |
|---|---|---|
| Y | 10 | 3.8 |
| Ag | 23 | 1.7 |
| Ce | 7.7 | 1.6 |
| Cu | 40 | 1.1 |
| Au | 5 | 1.1 |
| Ru, In | 0.5, 6 | 2.8 |
| Ag, Ru | 30, 2 | 2.2 |
| Ag, Rh | 19, 1 | 2.6 |
| Pure Pd | — | 1.0 |

Specifically, 30 wt. % Ag stabilizes the α-phase even at room temperature. The equilibrium adsorption of hydrogen in the Pd—Ag alloy increases as the relative amount of Ag in the alloy is increased. However, the diffusion coefficient of hydrogen into the alloy decreases with increasing Ag content. As a result of these two opposing factors, the permeability (which is the product of solubility coefficient and the diffusion coefficient), for a Ag—Pd alloy reaches a maximum value of 1.7 times the permeability of pure Pd at 23 wt. % Ag and a temperature of 350° C.

Regarding the relative costs of the above materials, Cu and Ag are the least expensive. Moreover, the 60 wt. % Pd-40 wt. % Cu composition is sulfur-tolerant, as indicated by the preliminary results described in the earlier-mentioned DOE report by Way that show that exposure to 100 ppm $H_2S$ in a 50%/50% $H_2/N_2$ mixture inhibits or reduces the $H_2$ permeation, but this effect is reversible. In the presence of steam, the reduction of the $H_2$ permeation due to $H_2S$ exposure is less severe.

In view of the foregoing, Cu becomes a preferred binary constituent with Pd, for the reasons of cost and relative sulfur tolerance. Within the Pd—Cu binary system, the 60 wt. % Pd-40 wt. % Cu composition has previously been found, in U.S. Pat. No. 3,439,474 to McKinley, to exhibit the highest $H_2$ permeation because of the formation of an ordered, BCC crystal structure (β-phase). However, there are long-term stability implications with this composition that need to be addressed. Thermal stability is a key requirement for the long-term (>10,000 h) durability of the $H_2$-separation membrane, in addition to permeability, cost and S-tolerance.

That 60 wt. % Pd-40 wt. % Cu alloy is somewhat of an anomaly. It has an ordered BCC structure, while both Pd and Cu have FCC crystal structures. The optimum bulk structure, exposed crystallographic orientation at the surface, and reactivity of surface binding sites for a given alloy composition are determined by the most stable arrangement and bonding hybridization of the local directional transition metal electronic states.

Figure 1B:
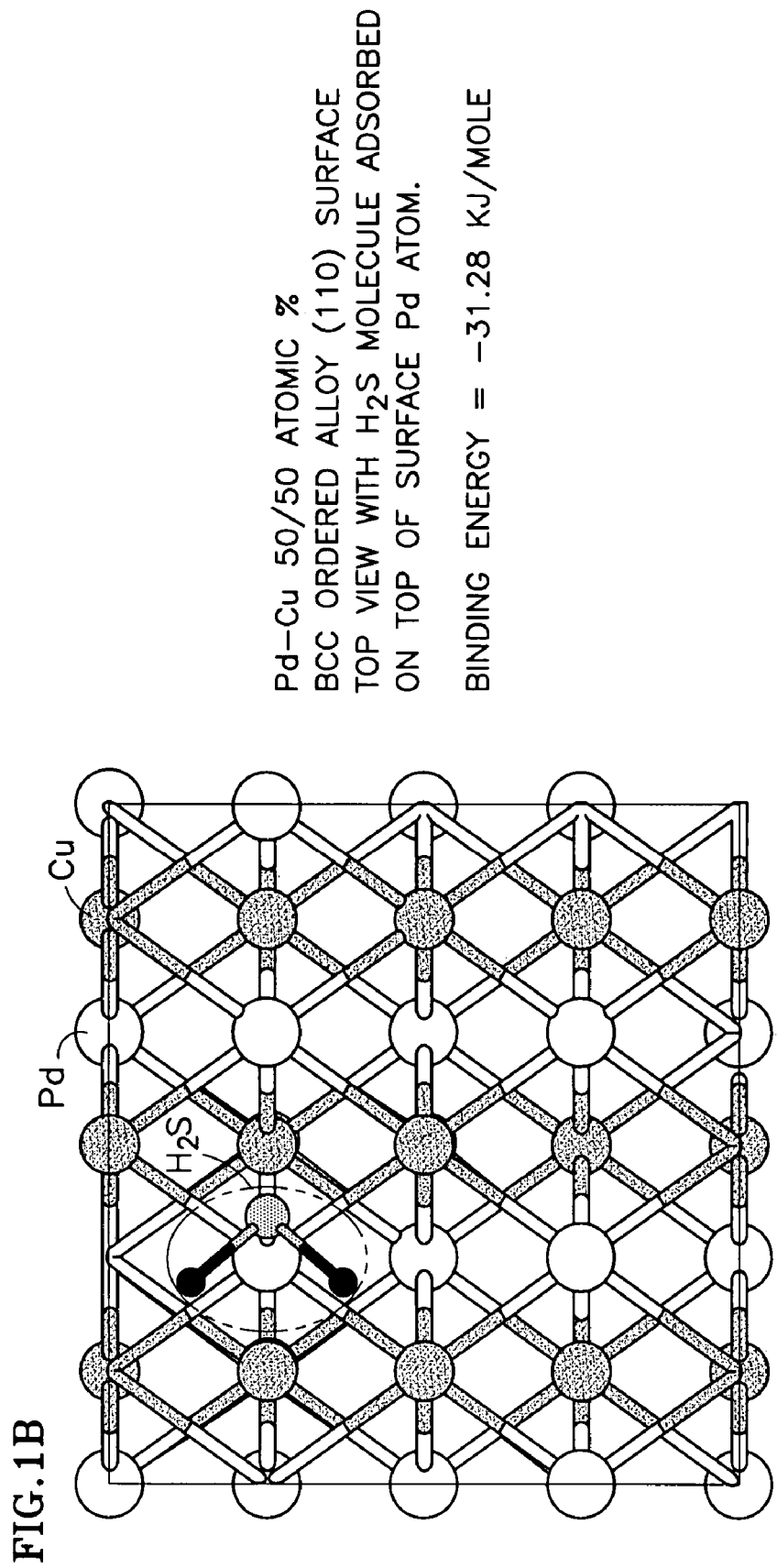
FIG. 1B depicts the adsorption of $H_2S$ on (110) lattice plane of 50 at. % Pd-50 at. % Cu alloy.

Because it is difficult to observe the influence of alloy local atomic scale ionic and electronic structure on key desired performance properties directly through experiment, the present invention arose from the use of first principles modeling to design alloy properties from the ground up. Modeling was used to test compositions chosen by 1) the belief that to stabilize a BCC phase formed from two elements, Pd and Cu, that are normally FCC, a third element that is normally BCC should be added, and 2), that the choice of this should be guided in part by some empirical metallurgy guidance such as Hume-Rothery rules. As step 3), VASP (Vienna ab initio simulation package) is used to choose the possible elements selected following 1) and 2) above that when substituted for either Pd or Cu, preferably will lower the energy of the system. That is, the substitution is exothermic, or at most energy neutral or only very slightly endothermic. VASP is density functional theory atomic scale simulations, implemented with the plane wave, projector-augmented wave potentials. The VASP code was used to survey alloy bulk and surface structures formed by substituting one or more elements in the Pd—Cu ordered BCC structure. Atomic scale and thermodynamic modeling were combined to virtually tune the sulfur-tolerance, phase stability, and hydrogen permeability of advanced membrane compositions. Referring to FIGS. 1A and 1B respectively, atomistic calculations carried out on a 3 (unit cell)×2 (unit cell) supercell slab that is 6 atomic layers deep using the latest projector-augmented wave potentials revealed that $H_2$ (FIG. 1A) and $H_2S$ (FIG. 1B) have competitive adsorption energies on the [110] most energetically favorable surface of this alloy. More specifically, the adsorption energy, or binding energy, of $H_2$ on the [110] surface of this alloy as seen in FIG. 1A was seen to be about −33.6 KJ/Mole, whereas the adsorption energy, or binding energy, of $H_2S$ on the 110 surface of this alloy as seen in FIG. 1B was seen to be about −31.3 KJ/Mole. The adsorption of $H_2S$ is less favored over $H_2$ by 2.3 KJ per mole, resulting in a shorter residence time for the $H_2S$ adsorbate complex on the alloy surface and consequently more sites available on the surface for $H_2$ chemisorption and dissociation. The foregoing calculations also appear to indicate that the $H_2S$ FCC Pd-rich adduct, or the $H_2S$ FCC Cu-rich adduct are slightly more stable than the $H_2S$ BCC Pd adduct. This means that at 400° C., $H_2S$ will, over time, cause the disproportionation of the BCC 60 wt. % Pd-40 wt. % Cu alloy into a Pd-rich and a Cu-rich phase; thus causing a loss of $H_2$ permeability and eventual physical cracking. The permeability loss can occur if the adsorption of $H_2S$ is sufficiently favored over $H_2$ and the surface becomes covered with $H_2S$, and its dissociative chemisorption product, chemisorbed sulfur, S*. This blocks the sites necessary to the dissociative chemisorption of $H_2$. Additionally, in a sufficiently thin membrane, the interlocked BCC 60 wt. % Pd-40 wt. % Cu crystallites transform into S* covered Pd- and Cu-rich domains, with S* along the grain boundaries. This leads to cracking and the loss of selectivity.

Analyzing the Pd—Cu system from an atomistic basis for clarification of lattice structure, it is noted that the maximum transformation temperature involving the ordered PdCu structure has been reported variously to be for a content of ~37 to ~50 at. % Pd. However, referring to FIG. 2 of a Pd—Cu phase diagram showing compositions of alloys A, B, and C respectively, it is also well established that the composition does not coincide with the ideal composition PdCu, (i.e., 50 at. % Pd-50 at. % Cu) shown as alloy "A". Rather, it lies closer to 40 at. % Pd shown as alloy "B". The maximum degree of atomic order, indicated by superlattice lines or electrical resistivity, is reported to lie at 47 at. % (60 wt % Pd) for the PdCu region. This latter composition, i.e. alloy "C", coincides with maximum hydrogen permeability and indicates an advantage for the ordered crystal structure as a membrane material.

Regardless of these attributes, the thermal cycles associated with start-up and shutdown of a typical WGS reactor would cause a Pd-alloy, such as 47 at. % Pd-53 at. % Cu, to undergo phase changes as it crosses the β/α+β solvus line. For example, the lattice parameter of an alloy with 45.5 at. % Pd changes from 0.3752 nm in the disordered state (α-phase, FCC), to 0.2973 nm in the ordered state (β-phase, BCC). The consequent dimensional changes can distort the membrane, leading to mechanical instability over time.

An important aspect of the present invention is the development of an alloy system wherein the permeability (which appears to be associated with the maximum degree of ordering in the α-phase) of the Pd—Cu system, is retained during operating cycles. Such operating cycles typically involve cycling the temperature on start-up from ambient to >400° C., and the reverse on cool down. This is achieved by stabilizing the β-phase within the range of service temperatures.

Figure 2:
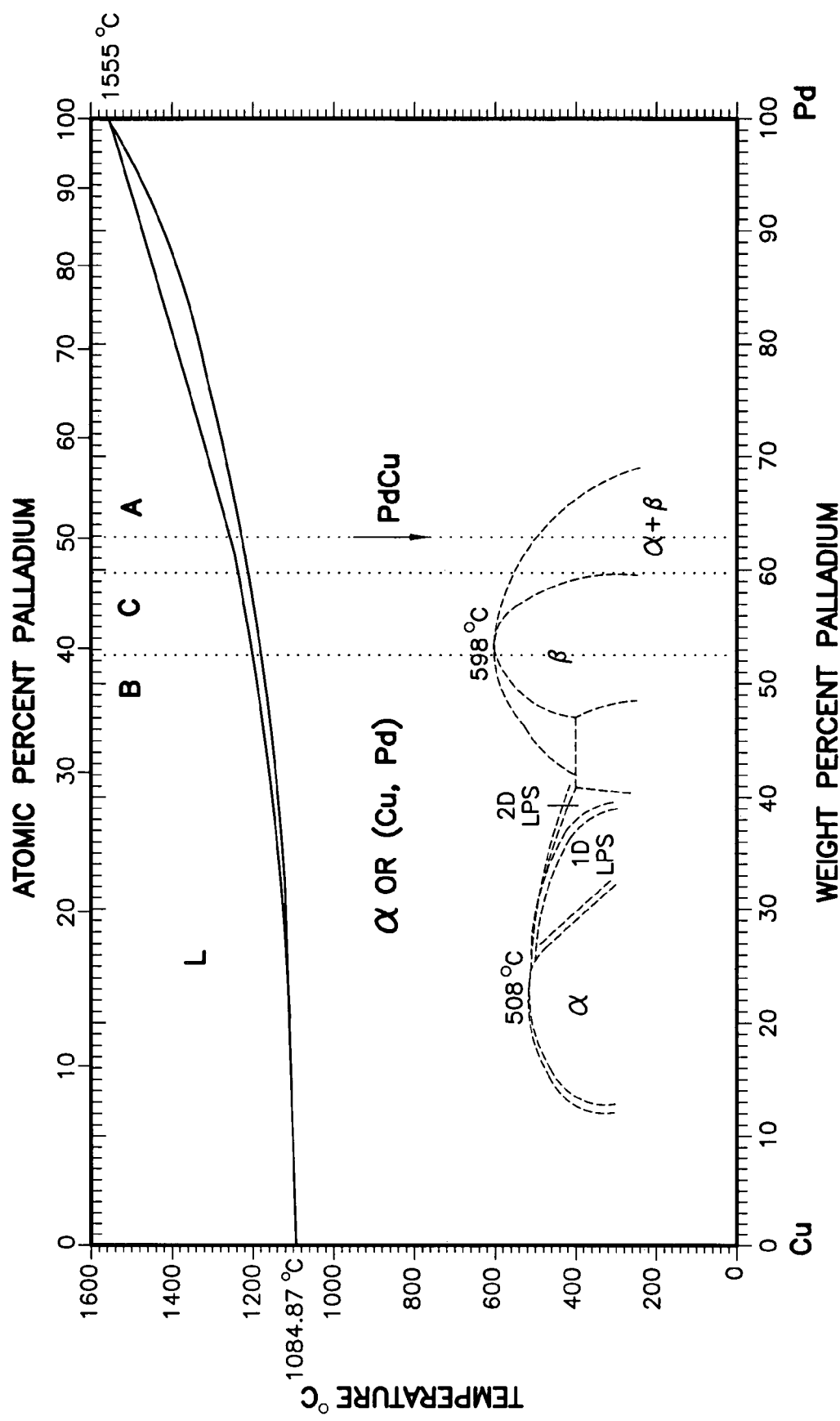
FIG. 2 is a Pd—Cu phase diagram showing compositions of alloys A, B, and C respectively.

The 40 at. % Pd composition, alloy "B" depicted in FIG. 2, has the maximum β-phase thermal stability up to ~600° C., but reduced permeability. Therefore, in accordance with an aspect of the invention, it has been determined to substitute ternary or higher order elements, for example, elements with a BCC crystal structure, on an atomic basis and selected singularly or in combination, from a class of elements including, but not limited to, Fe, Cr, Nb, Ta, V, Mo, and W that can manifest a BCC phase in the temperature range of interest, e. g., ambient to >400° C. Indeed, the upper end of that temperature range may increase to 600° C. or more in some operating environments. The ternary element identified above is selected from a group of constituent metals termed "M" for convenience in the present invention, and acts or serves to stabilize the β-phase in the preferred 47 at. % Pd—Cu binary alloy. More specifically, to the extent more than one element (constituent) may be selected from the group "M" for shared combination with the Pd and Cu, it then becomes technically inconsistent to refer to both of those constituents from the group "M" as "ternary" in as much as one is a fourth, or quaternary, constituent. Thus, the one or more constituents selected for their BCC phase characteristics will be designated as "from the group "M". As needed, one or more non-BCC elements (e. g., FCC, tetragonal, hexagonal, etc.) may be selected from the group "N" for shared combination with the Pd, Cu and the group "M" element(s), to improve the aforementioned desired membrane characteristics, particularly with respect to ductility. Thus, the one or more constituents selected for their non-BCC phase characteristics will be designated as "from the group "N". Group "N" consists of the following elements: Ag, Au, Re, Ru, Rh, Y, Ni, Ce, Ir, Pt, Co, La and In. If operation is likely to occur in a $\sim 5\times 10^{-3}$ atm $H_2S$, high steam environment, then Au and Rh are preferred amongst these group N elements.

Selected elemental atom sites may be substituted in the intrinsic crystallographic structure of a given metallurgical phase with other elements that tend to form the same or different crystal structures as a means to stabilize or destabilize respectively, the parent phase structure to achieve different property changes. An example includes the alloying of steels to stabilize the austenitic (FCC) or ferritic (BCC) phase structures with corresponding FCC or BCC elements, respectively. Similarly, in complex superalloys, corresponding elements may be incorporated to stabilize the gamma or gamma-prime phases respectively, to meet structure/property goals.

The present invention uses the novel substitution of one or more other elements, "X", into selected elemental atom sites in the intrinsic crystallographic structure of Pd alloys, where "X" is at least an element that tends to form the same or different crystal structures as a means to stabilize or destabilize, respectively, the parent phase structure to achieve different property changes. In the context of usage herein, the one or more elements "X" include at least one element from group "M", and preferably also at least one element from group "N". As noted earlier, it is also possible to have more than one element from each of the groups "M" and "N". The relative stability of this substitution is established by atomistic modeling. In addition, the stability of the resulting ternary, quaternary, or higher order alloy to elemental segregation in the presence of sulfur-containing reformate is established using atomistic modeling. Reformate is defined broadly as a mixture of gases containing at least $H_2$, and CO, and for the purposes of conducting the water gas shift reaction, steam, $H_2O$. eformate may also contain $CO_2$, $N_2$, Ar, $CH_4$, $H_2S$ and non-methane hydrocarbons as well as COS and other impurities.

As indicated above, the alloy "C" composition (47 at. % Pd-53 at. % Cu), shown in FIG. 2, has been determined to have both the maximum degree of order and the maximum hydrogen permeability in the Pd—Cu system. However, its solidification locus traverses into a two-phase, α+β, field as it crosses the α/α+β solvus line and potentially the β/α+β solvus line at a lower temperature, assuming equilibrium conditions. The 40 at. % Pd-60 at. % Cu composition, alloy "B", locus nominally crosses the α/β, disordered/ordered transition at ~600° C., yielding a nominally stable single-phase β (BCC) structure between ~600° C. and room temperature. The shift in composition from "C" to "B" is ~7at. %. Pd and Cu have FCC lattices and show complete solid solubility at higher temperatures above ~600° C., i.e. Pd and Cu atoms populate the same lattice. Hence, substitution of BCC elements from group "M" into the Pd—Cu lattice will tend to promote a change in lattice class to the BCC β structure in the Pd—Cu—X alloy, thereby promoting β-phase thermal stability from room temperature to ~600° C.

It has been determined that elements that tend to stabilize the BCC structure are typically also BCC, such as Fe, Cr, Nb, Ta, V, Mo, and W. These potentially suitable ternary or higher order elements and their atomic size and lattice relationships are given in Table II below. The ability of one element to substitute into the crystal lattice of another depends on several factors. The difference, among other requirements, between the unit cell lattice parameters of the parent Pd—Cu matrix and a particular constituent addition from group "M" is preferably small. Partial guidance could be obtained by considering the alloy system in terms of one or more of the Hume-Rothery empirical rules. Briefly, these rules indicate that for favorable substitution to occur, the atomic size difference should be less than ~15%, the electronegativities should be comparable, valences should be similar, and the crystal structures should be the same.

(12.3%) and some other criteria are met for Pd—Cu, which shows complete solid solubility at elevated temperatures. However, while Fe, Cr, V, Mo, and W also have low atomic size differences, they do not form complete solid solutions with Pd, in part because of variance in the other factors. Thus, while some of the Hume-Rothery empirical rules for complete solid solubility provide some guidance in the determination of metals that make up the group "M", they do not guide or even make obvious the ultimate selection because, in part, it is inconsistent with some of those rules. For instance, while the first Hume-Rothery criterion, size, has to be noted, the third criterion, that concerning the alloying element having the same crystal structure, is inconsistent with the results of the invention. Both Pd and Cu are FCC metals, while the metals of group "M", to wit, V, Nb, Ta, alpha-Cr, Mo, W, and alpha-Fe are all BCC. Similarly, V, Nb, Ta, alpha-Cr, Mo, and W could not be said to have the same valence as either Pd or Cu.

The determination of the alloys of the present invention is not readily apparent from a consideration of conventional alloying guidelines such as the Hume-Rothery rules. Instead, with respect to identifying alloying elements to solve the present needs, a different methodology was undertaken. Specifically, considering that the alloying elements were all essentially cubic lattices (FCC, BCC), the difference in lattice sizes could also reflect the differences in atomic sizes, but be more discerning in the alloying characteristics in this instance. The elements are compared largely on the basis of alpha- or beta-phase stabilizers so that alloying beta-stabilizers (typically BCC with more open lattices than FCC regarding hydrogen diffusivity etc.) could influence both the atomic size averages and the type of lattice formation to suit the alloy design. The elements in Table II are, therefore, also compared on the basis of lattice size differences. By utilizing this approach, Table II indicates, in particular, Ta (8.6%) and Nb (8.7%) to be the most preferred elements, with the difference in lattice size of the metal from group "M" with respect to each of Pd and of Cu being less than about 16%. Neither element would be selected based on the atomic size differences, also shown in Table II, which are ~33% each for both

TABLE II

Atomic and lattice size factor considerations

| Element/ alloy | Pearson Space Group | Lattice parameter "a" (nm) | Atomic Radius (Angstrom) | Atomic size difference | | At. Wt. | Lattice size difference | |
|---|---|---|---|---|---|---|---|---|
| | | | | with Pd (%) | with Cu (%) | | with Pd (%) | with Cu (%) |
| Pd | cF4 | 0.38903 | 1.79 | | | 106.4 | | |
| Cu | cF4 | 0.36146 | 1.57 | 12.3 | | 63.54 | 7.1 | |
| alpha Fe | cI2 | 0.28665 | 1.72 | 3.9 | −9.6 | 55.85 | 26.3 | 20.7 |
| alpha Cr | cI2 | 0.28848 | 1.85 | −3.4 | −17.8 | 52 | 25.8 | 20.2 |
| Ta | cI2 | 0.3303 | 2.09 | −16.8 | −33.1 | 180.95 | 15.1 | 8.6 |
| Mo | cI2 | 0.3147 | 2.01 | −12.3 | −28 | 95.94 | 19.1 | 12.9 |
| V | cI2 | 0.3024 | 1.92 | −7.3 | −22.3 | 50.94 | 22.3 | 16.3 |
| W | cI2 | 0.31652 | 2.02 | −12.8 | −28.7 | 183.85 | 18.6 | 12.4 |
| Nb | cI2 | 0.33004 | 2.08 | −16.2 | −32.5 | 92.91 | 15.2 | 8.7 |

Interestingly, Table II shows that the atomic size difference between Cu and the alloying elements ultimately preferred herein is generally large and greater than ~15%, thus seeming to be nominally unsuitable under that Hume-Rothery criterion. Application of this Hume-Rothery empirical rule with regard to atomic size difference between Pd and the several elements of interest herein indicates that the size factor Ta and Nb. It remains unclear whether the lattice size difference adheres to a specific number around 15%, but the smaller the difference the more favorable it would appear for positive effects.

The alloys of the present invention are designed to meet the criteria of maximizing the $H_2$ permeance and thermal stability as well as stability in the presence of carbon oxides, steam and sulfur containing gases, rather than complete solid solubility alone. Indeed, it is notable that preferred compositions are not contingent on meeting all the Hume-Rothery criteria. In order for BCC elements to substitute into Alloy C, the lattice size factor gives an initial guide indicating Ta and Nb as preferred additions from group "M". Retaining the $H_2$ permeance while minimizing the level of phase change, is the goal of these alloy designs. In general, the approximate compositions of selected ternary alloys, each including an element from group "M" and derived by atomic substitution, are indicated in Table III.

Between the two aforementioned approaches, it is possible to identify compositions that optimize both permanence and stability. Such compositions, as indicated above, may be ternary or higher order, e.g. Pd—Cu—Ta—Au, etc, where the quaternary constituent is selected from group "N" for the primary purpose of favorably balancing the composition, as needed, for other desirable membrane characteristics, such as ductility or coefficient of thermal expansion. The component from group "N", here selected to be Au for its malleability and positive effect on permeability, serves to preserve or enhance the ductility of the alloy system under the WGS operating

TABLE III

Substitution for Cu in Alloy C (max order/permeability)

| Element alloy | Pd—Cu at. % | Pd—Cu—M at. % | Pd—Cu—Fe wt. % | Pd—Cu—Cr wt. % | Pd—Cu—Ta wt. % | Pd—Cu—Mo wt. % | Pd—Cu—V wt. % | Pd—Cu—W wt. % | Pd—Cu—Nb wt. % |
|---|---|---|---|---|---|---|---|---|---|
| Pd | 47.0 | 47.0 | 60.1 | 60.3 | 54.4 | 58.2 | 60.4 | 61.7 | 58.3 |
| Cu | 53.0 | 46.0 | 35.2 | 35.3 | 31.8 | 34.0 | 35.3 | 31.7 | 34.1 |
| "M" | | 7.0 | | | | | | | |
| Fe | | | 4.7 | | | | | | |
| Cr | | | | 4.4 | | | | | |
| Ta | | | | | 13.8 | | | | |
| Mo | | | | | | 7.8 | | | |
| V | | | | | | | 4.3 | | |
| W | | | | | | | | 14.0 | |
| Nb | | | | | | | | | 7.6 |

The philosophy, or logic, that guided the formulation of Table III is as follows. The difference in the compositions denoted by "B" and "C" lines in FIG. 2 is 7 at. % Cu. "B" has the best stability and "C" the best permeability. The dominant element in the Pd—Cu system with respect to permeability characteristics is Pd. Therefore, Pd is preferably held constant in alloys "C" and "B" when alloying further with other elements. Hence, the atomic substitution, for Cu, by selected elements chosen for their respective alloying behavior, is intended to improve the permeability of "B" or, alternatively, improve the stability of "C".

As an alternative to the foregoing approach of retaining or enhancing the single phase stability of alloy C, it is also possible to add suitable BCC elements, such as the elements of group "M", with alloy B to retain β-phase thermal stability while improving the permeance and degree of ordering by shifting the composition toward these characteristics. Potentially suitable ternary compositions derived from this approach are shown in Table IV.

conditions. Using the "B" alloy technique, at least the ternary element is selected from group "M" of BCC elements that tend to stabilize the β-phase. More specifically, for reasons of smaller atomic misfit and overall alloy stability (i. e., highly negative values of $\Delta G_o$; the heat of formation), Ta and Nb are preferred. Hence a Pd—Cu—X alloy, e. g., Pd—Cu—Ta (or Nb)-alloy, wherein X=M+N (and N may be zero) and which is a robust product, is the primary goal achieved by the present invention.

An example of a preferred alloy results from VASP atomic modeling of 6.25 at. % Nb or Ta in substitution for Cu in the Cu sublattice of a 50 atomic % Pd-50 atomic % Cu ordered alloy. For the resulting alloy, 50 at. % Pd, 43.75 at. % Cu, and 6.25% at. % Nb, the heat of formation at 0° K is 6.84 kJ/mole atom lower than the unsubstituted PdCu alloy. The corresponding Ta alloy has a heat of formation at 0° K. that is 9.35 kJ/mole atom lower than the unsubstituted PdCu alloy. In other words if $Pd_8Cu_8$ has a heat of formation of −12.35 kJ/mole atom, the $Pd_8Cu_7Nb$ heat of formation is −19.19

TABLE IV

Substitution for Cu in Alloy B (minimum phase change)

| Element/ Alloy | Pd—Cu at. % | Pd—Cu—M at. % | Pd—Cu—Fe wt. % | Pd—Cu—Cr wt. % | Pd—Cu—Ta wt. % | Pd—Cu—Mo wt. % | Pd—Cu—V wt. % | Pd—Cu—W wt. % | Pd—Nb—W wt. % |
|---|---|---|---|---|---|---|---|---|---|
| Pd | 40.0 | 40.0 | 53.1 | 53.3 | 47.9 | 51.3 | 60.4 | 54.5 | 51.4 |
| Cu | 60.0 | 53.0 | 42.0 | 42.2 | 37.9 | 40.6 | 35.3 | 37.8 | 40.7 |
| "M" | | 7.0 | | | | | | | |
| Fe | | | 4.9 | | | | | | |
| Cr | | | | 4.5 | | | | | |
| Ta | | | | | 14.2 | | | | |
| Mo | | | | | | 8.1 | | | |
| V | | | | | | | 4.3 | | |
| W | | | | | | | | 14.4 | |
| Nb | | | | | | | | | 7.9 | kJ/mole atom and that of $Pd_8Cu_7Ta$ is −21.70 kJ/mole atom. In other words, the substitution is exothermic. It appears that the substitution of these transition metals for Cu is consistently more favorable than their substitution on the Pd sublattice. Thus the results are construed to indicate that the ternary Pd—Cu—Nb or Pd—Cu—Ta should be spontaneous and stable with respect to segregation to the binary 50 atomic % Pd-50 atomic % Cu ordered alloy and the pure substituents phase. Moreover, the substitution of these transition metals increases the average atomic volume and bond distances, increased average atomic volume and bond distances correlate well with improved hydrogen mobility. Thus, the ternary alloy formation is expected to stabilize the BCC ordered structure, while offering the likelihood of improved hydrogen permeance.

Additionally, there are alloys within the scope of this invention that will stabilize the BCC structure and yield sufficient hydrogen permeance under harsh operating conditions while having a slightly endothermic heat of formation. For example, the $Pd_8Cu_7W$ alloy that has a heat of formation of −10.47 kJ/mole atom. It thus has a 15.22% higher heat of formation than $Pd_8Cu_8$ at −12.35 kJ/mole atom.

Figure 3:
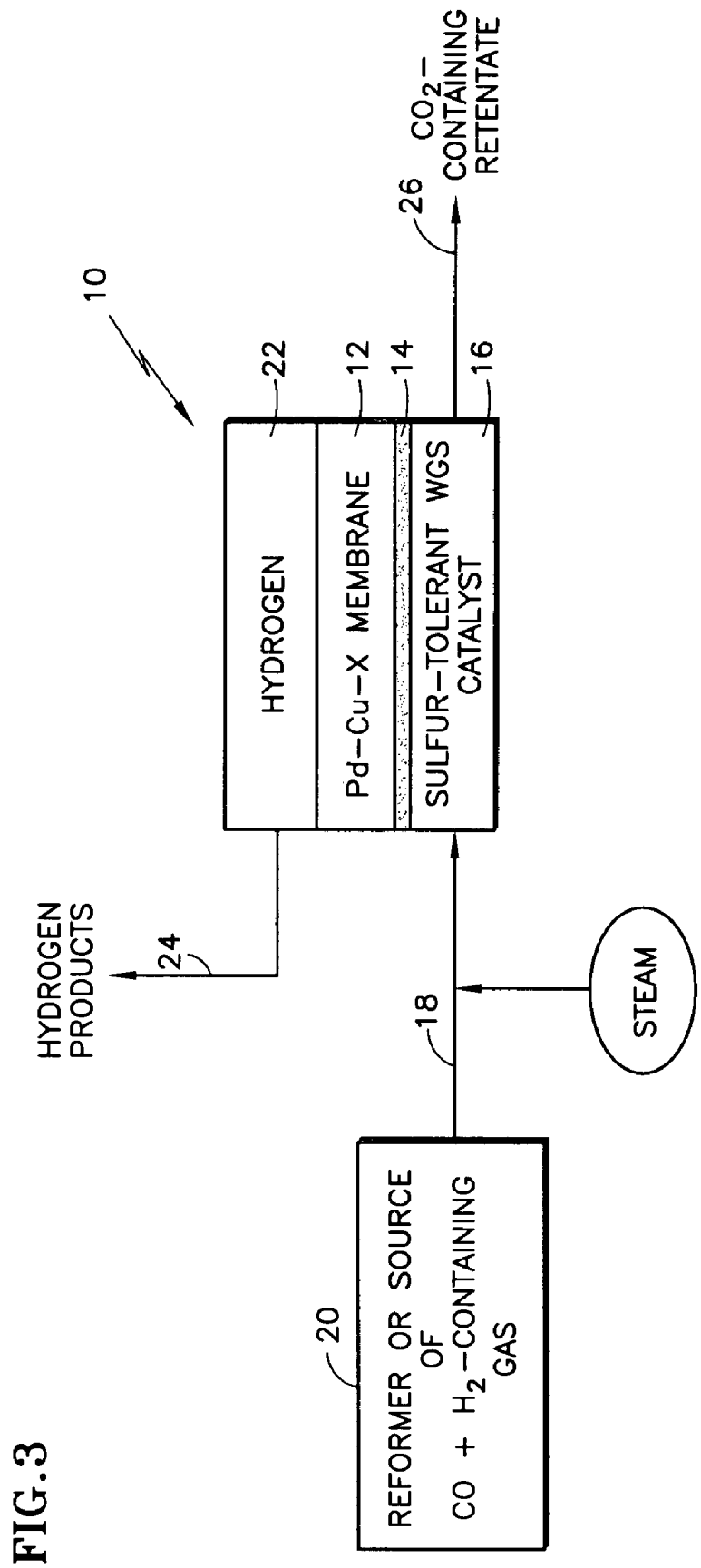
FIG. 3 is a generalized schematic block diagram of a water gas shift system employing a hydrogen separation membrane formed of the alloy of the invention for the production of hydrogen.

Referring to FIG. 3, there is depicted a generalized schematic block diagram of a system 10 employing a hydrogen separation membrane 12 for the production of hydrogen. The hydrogen separation membrane 12 is formed of the novel alloy disclosed herein, and may be supported by a substrate 14 in operative association with a gas stream containing at least $H_2$ and CO and/or $CO_2$, for selectively separating the $H_2$ therefrom. Typically, the separation membrane 12 is associated with a water gas shift reactor 16 which contains a sulfur-tolerant catalyst for facilitating the WGS reaction on a stream of reformate 18, as from a reformer 20. The WGS reaction converts CO to $CO_2$ and increases the presence of free $H_2$, in a well known manner. The hydrogen separation membrane 12 selectively separates $H_2$ from the product of the WGS reaction and passes it to an $H_2$ chamber 22 from which a stream 24 of relatively pure $H_2$ product is supplied. A retentate stream 26, rich in $CO_2$, issues from the WGS reactor 16 following the removal of the free $H_2$ by the hydrogen separation membrane 12. In some instances, such a hydrogen separation membrane employing the alloy of the invention may also, or alternatively, be used in conjunction with a reforming reactor to facilitate the removal of $H_2$ as part of, or an adjunct to, the reforming process.

It may thus be appreciated from the above detailed description of the preferred embodiment that the present invention relates generally to the development of an inorganic composite Pd—Cu-based membrane reactor module that is structurally stable under the fuel reforming Water Gas Shift (WGS) reaction conditions with a high selectivity and flux rate for hydrogen permeation through the membrane and acceptable tolerance to sulfur contamination. More particularly, the present invention relates to the development of an alloy system used as the membrane, such as the Pd—Cu—X, wherein the measured, maximum permeability of the β BCC phase is retained without undergoing a significant phase change during operating temperature cycles. As used here, a significant phase change is one that changes or decreases hydrogen permeability, life, thermal cycling tolerance, etc. more than a few percent. The life of an alloy is normally a function of the use environment and the number of stop-start cycles. A resistance to sulfidation is understood to mean resistance to forming a sulfide or oxysulfide phase under the normally-expected operating conditions.

Further, the present invention relates to and embraces the general use of the herein described alloys in a Water Gas Shift Membrane reactor, a hydrocarbon or biomass reforming reactor producing hydrogen or a membrane section between Water Gas Shift Catalyst or Reforming catalyst segments, or between Water Gas Shift Reactors or reforming reactors. As will be readily understood by those skilled in the art, these membranes may be made through a wide variety of methods ranging from electroless plating through chemical vapor deposition to various vacuum sputtering techniques. These membranes may be self supporting or on a porous support to provide physical strength. The porous support may be a composite of an oxide or refractory compound or compounds or metal on a porous tubular material or plate of stainless steel or other material. Due consideration should be given to the impact of the various coefficients of thermal expansion and for the Pd alloy membrane lattice expansion in the presence of hydrogen when designing such a composite system for use in a hydrogen plant, especially in conjunction with Water Gas Shift reactors.

Although the foregoing description of the present invention has been shown and described with reference to particular embodiments and applications thereof, it has been presented for purposes of illustration and description and is not intended to be exhaustive or to limit the invention to the particular embodiments and applications disclosed.

What is claimed is:

1. An alloy for use as an $H_2$-separation membrane, comprising in combination: palladium (Pd), copper (Cu), and "X", where "X" comprises at least one metal from a group "M" that is BCC and acts to stabilize the β BCC phase in the alloy sufficiently that any non-BCC type phases present in the alloy have negligible effect on temperature-related phase changes of the alloy, and wherein the at least one metal from group "M" is selected from the group consisting of Nb, Ta, V, Mo, and W.

2. The alloy of claim 1 wherein the Pd of said alloy is at least 35 at. % and the Cu of said alloy is greater than about 43 at. %.

3. The alloy of claim 1 wherein the at least one metal from group "M" is selected from the group consisting of Ta and Nb.

4. The alloy of claim 1 wherein "X" further comprises at least one additional metal from a group "N" of metals that is non-BCC and that enhances a further required property of the membrane in addition to thermal stability.

5. The alloy of claim 4 wherein the at least one metal from group "N" is preferably FCC.

6. The alloy of claim 4 wherein the at least one metal from group "N" enhances the ductility of the membrane.

7. The alloy of claim 6 wherein the at least one metal from group "N" is Au.

8. The alloy of claim 4 wherein the at least one metal from group "N" is selected from the group consisting of Ag, Au, Re, Ru, Rh, Y, Ce, Ni, Ir, Pt, Co, La and In.

9. The alloy of claim 1 wherein, for the Pd—Cu—X alloy, the at. % of Pd is in the range of about 35 to about 55, and the at. % of "X" in the alloy is in the range of about 1 to about 15.

10. The alloy of claim 9 wherein, for the Pd——Cu—X alloy, the at. % of Pd is about 40, the at. % of Cu is about 53, and the at. % of "X" is about 7, to minimize phase change in the alloy.

11. The alloy of claim 9 wherein, for the Pd—Cu—X alloy, the at. % of Pd is about 47, the at. % of Cu is about 46, and the at. % of "X" is about 7, to maximize hydrogen permeability in the alloy.

12. The alloy of claim 1 wherein the difference in lattice size of the metal from group "M" with respect to each of Pd and of Cu is less than about 16%.

13. A Pd—Cu—X alloy that functions as a hydrogen separation membrane in the presence of sulfur-containing reformate, the Pd of said alloy being at least 35 at. %, the Cu of said alloy being greater than about 43 at. %, and the X of said alloy comprises at least one BCC metal from a group consisting of Nb, Ta, V, Mo, and W, said alloy being stable and resistant to sulfur-contamination for at least 1000 hours in the presence of sulfur-containing gases having a ratio of water to sulfur of at least 5000 to 1 and a temperature of at least 250° C.

14. A Pd—Cu—X alloy that functions as a hydrogen separation membrane that is stable and resistant for at least 1000 hours to carbon monoxide in the presence of a water-containing reformate, where the ratio of water to carbon monoxide is at least 2 to 1 and the temperature is at least 250° C., the Pd of said alloy being at least 35 at. %, the Cu of said alloy being greater than about 43 at. %, and the X of said alloy comprises at least one BCC metal from a group consisting of Nb, Ta, V, Mo, and W.

15. A fuel processing system (10) for separating $H_2$ from a process stream (18) containing $H_2$, comprising:
   a first chamber (16) for receiving the process stream containing $H_2$;
   a second chamber (22) for receiving $H_2$ separated from the process stream in the first chamber;
   an $H_2$-separation membrane (12) separating the first and second chambers for the selective separation of $H_2$ from the process stream in the first chamber; and
   wherein the $H_2$ separation membrane comprises an alloy consisting of palladium (Pd), copper (Cu), and "X" where "X" comprises at least a metal from the group "M" that is BCC and acts to stabilize the $\beta$ BCC phase such that any non-BCC type phases present have negligible effect on temperature-related phase changes of the alloy, and wherein the at least one metal from group "M" is selected from the group consisting of Nb, Ta, V, Mo, and W.

* * * * *